United States Patent
Ro et al.

(10) Patent No.: US 8,008,815 B2
(45) Date of Patent: Aug. 30, 2011

(54) PLANAR STAGE MOVING APPARATUS FOR MACHINE

(75) Inventors: Seung-Kook Ro, Yuseong-gu (KR); Jong-Kweon Park, Yuseong-gu (KR)

(73) Assignee: Korea Institute of Machinery & Materials, Yuseong-gu (KR)

( * ) Notice: Subject to any disclaimer, the term of this patent is extended or adjusted under 35 U.S.C. 154(b) by 477 days.

(21) Appl. No.: 12/198,476

(22) Filed: Aug. 26, 2008

(65) Prior Publication Data
US 2009/0056594 A1 Mar. 5, 2009

(30) Foreign Application Priority Data
Sep. 3, 2007 (KR) .................. 10-2007-0088980

(51) Int. Cl.
- H02K 41/02 (2006.01)
- H02K 7/08 (2006.01)
- B23Q 1/62 (2006.01)

(52) U.S. Cl. ............... 310/12.31; 310/12.05; 310/12.27

(58) Field of Classification Search ............ 310/12.05, 310/12.06, 12.31, 12.27
See application file for complete search history.

(56) References Cited

U.S. PATENT DOCUMENTS

| | | | | |
|---|---|---|---|---|
| 3,935,486 A | * | 1/1976 | Nagashima ............... | 310/12.06 |
| 6,324,933 B1 | | 12/2001 | Waskiewicz et al. | |
| 6,730,916 B1 | * | 5/2004 | Tsuji et al. ............... | 250/442.11 |
| 7,084,538 B2 | * | 8/2006 | Takashima ................. | 310/90.5 |
| 7,257,902 B2 | * | 8/2007 | Gao et al. .................. | 33/1 M |
| 2008/0012511 A1 | * | 1/2008 | Ono .......................... | 318/35 |

FOREIGN PATENT DOCUMENTS

| | | |
|---|---|---|
| DE | 30 37 648 A1 | 4/1981 |
| DE | 42 06 544 A1 | 9/1993 |
| DE | 42 12 990 A1 | 10/1993 |
| DE | 195 11 973 A1 | 12/1996 |
| JP | 61-13314 | 1/1986 |
| KR | 10-2007-0052524 | 5/2007 |

* cited by examiner

*Primary Examiner* — Burton Mullins
(74) *Attorney, Agent, or Firm* — Oblon, Spivak, McClelland, Maier & Neustadt, L.L.P.

(57) ABSTRACT

A planar stage moving apparatus for a machine includes: first to fourth linear motors for applying, between a base, i.e. a fixed body and a table, i.e. a movable body, a movement force to the table, each linear motor including a stator core on which a coil is wound and which is fixed to the base and a mover core to which a permanent magnet is attached and which is fixed to the table; an air bearing unit provided between the base and the table to move the table under the influence of magnet fields when currents are applied to the coils of the linear motors; and a linear encoder installed on one side of the table to measure movement of the table.

6 Claims, 10 Drawing Sheets

PLANAR STAGE MOVING APPARATUS FOR MACHINE

BACKGROUND OF THE INVENTION

1. Field of the Invention

The present invention relates generally to a planar stage moving apparatus for a machine and, more particularly, to a planar stage moving apparatus for a machine that enables reduction of the size of a table transfer system and accurate transfer of a table provided in a machine such as a milling machine by moving the table using an electromagnetic force.

2. Description of the Related Art

An apparatus for carrying out a necessary operation while a table positioned on a base is being moved by a separate transfer unit provided for a machine tool or a measurement tool used in the industrial field. In particular, a machine tool such as a milling machine or a wire cutting machine that has a tool fixed to an upper portion of a table to machine a work piece is provided with a table moving unit for moving the table under the control of an NC controller.

A general table moving unit for a machine converts rotational force generated by an electric motor to linear movement forces to move a table, i.e. a movable body with respect to a base, i.e. a fixed body. Accordingly, when a table needs to be moved transversely (in the X-axis direction) and longitudinally (in the Y-axis direction) as in a machine tool such as a milling machine, it is necessary for the machine tool to separately include a movement shaft for transverse movement of the table and a movement shaft for longitudinal movement of the table, in which case the structure of a table moving unit is complex and large-sized.

The applicant of the present invention has already developed "a miniaturized stage apparatus using a permanent magnet driven linear motor and an air bearing" to improve the shortcomings of a table moving unit applied to a general machine. FIGS. 1A and 1B are views schematically illustrating Korean Patent Laid-Open No. 10-2007-0052524 titled "a miniaturized stage apparatus using a permanent magnet driven linear motor and an air bearing" and filed by the applicant of the present invention.

As illustrated in FIGS. 1A and 1B, a stage moving apparatus 100 includes a base 200, i.e. a fixed body and a table 300, i.e. a movable body. A linear (grid) encoder 600 for detecting movement of the table 300 is fixed to one side of the base 200. In particular, guide walls 210 and 310 are formed on both sides of the base 200 and the table 300 as illustrated, and motor mounting spaces 220 and 320 for mounting the linear motor 400 that provides a movement force to the table 300 are formed inside the base 200.

The linear motor 400 includes a stator core 420 on which a coil 410 is wound and a mover core 440 to which a pair of permanent magnets 430 are attached. When current flows through the coil 410 with permanent magnets formed on both sides of the linear motor 400 creating magnetic fields, the direction of a force is determined according to the directions of the current and magnetic fields. In other words, if current is applied to the coil 410, after the direction of a force is determined according to the direction of the current flowing through the coil 410, the table 300 is moved in a direction on the base 200. To achieve this, the direction of the current flowing through the coil 410 is arbitrarily controlled so that when the direction of the current applied to the coil 410 is reversed, the direction of force can also be reversed.

A pre-pressure is applied to prevent the table 300 from being separated from the base 200 and increase the strength of an air bearing during movement of the table 300 by the transfer force of the linear motor 400 using a magnetic force applied between the permanent magnet 430 of the linear motor 400 and the stator core 420 as an attractive force.

An air bearing unit 500 for preventing friction and interference during movement of the table 300 on the base 200 by the transfer force of the linear motor 400 is provided between the base 200 and the table 300. The air bearing unit 500 includes a plurality of air pads 510 fixed to a surface of the table facing the base 200 and air supply lines 520 for supplying a pneumatic pressure to the air pads 510 respectively. The directions of a repulsive force applied between the base 200 and the table 300 and an attractive force applied between the permanent magnet 430 of the linear motor 400 and the stator core 420 during the operation of the air bearing unit 500 are opposite to each other, and the magnitudes of the forces are the same, whereby the forces are in an equilibrium state so that when the transfer force by the operation of the linear motor 400 is transferred to the table 300, the table can be stably moved on the base 200.

As mentioned above, during movement of the table 300 by driving of the linear motor 400, the position of the table 300 is measured by the linear encoder and the table 300 is accurately controlled by an NC controller (not shown).

However, in the above-mentioned stage moving apparatus, since movement of a table is restricted only in one linear direction, the installation space for a movement unit for movement of the table needs to be increased to apply the stage moving apparatus to a machine tool such as a milling machine that requires movements in the transverse direction (X-axis direction), the longitudinal direction (Y-axis direction), and an angular direction. Furthermore, when two transfer shafts for X-Y axis transfer are stacked, the height of the entire stage increases and the strength of an upper portion of the stage decreases.

SUMMARY OF THE INVENTION

The present invention has been made in view of the above problems, and the present invention provides a planar stage moving apparatus for a machine that enables reduction of the size of a table transfer system and accurate transfer of a table provided in a machine such as a milling machine by moving the table using an electromagnetic force.

In order to achieve the objects, the present invention provides a planar stage moving apparatus for a machine including: first to fourth linear motors for applying, between a base, i.e. a fixed body and a table, i.e. a movable body, a movement force to the table, each linear motor including a stator core on which a coil is wound and which is fixed to the base and a mover core to which a permanent magnet is attached and which is fixed to the table; an air bearing unit provided between the base and the table to move the table under the influence of magnet fields when currents are applied to the coils of the linear motors; and a linear encoder installed on one side of the table to measure movement of the table, the first and third linear motors being provided between the base and the table on the lower and upper sides of the table respectively to move the table in the X-axis directional movement of the table, the second and fourth linear motors being provided between the base and the table on the right and left sides of the table respectively to move the table in the Y-axis directional movement of the table, the air bearing unit including a plurality of air pads fixed to the plurality of grooves formed on the lower surface of the table respectively and a plurality of air supply lines formed at intermediate portions of the table to provide a pneumatic pressure to the grooves respectively.

The front end of the first linear motor may be located on the front lower side of the table, the rear end of the third linear motor may be located on the rear upper side of the table, the lower end of the second linear motor may be located on the rear lower side of the table, and the upper end of the fourth linear motor may be located on the front upper side of the table.

The coils may be wound on both sides of the stator core of the linear motor so that currents flow through the stator core opposite to each other.

The air pads may be located between permanent magnets of the linear motors respectively.

The linear encoder may be fixed to a portion of the base that corresponds to a lower central portion of the table and a scaler in which a two-dimensional grid is expressed is attached to a lower central portion of the table.

The linear motors may be simultaneously operated in one direction to angularly move the table.

In a planar stage moving apparatus according to the present invention, when the planar stage moving apparatus is applied to a machine that needs transverse and longitudinal movements of a table, a movement unit for transverse movement of the table and a movement unit for longitudinal movement of the table are provided on a same plane between a base and the table, whereby spaces occupied by the movement units are reduced.

Furthermore, in the planar stage moving apparatus for a machine according to the present invention, when a linear motor for transverse movement of a table and a linear motor for longitudinal movement of the table are simultaneously driven, the table can be angularly moved, whereby the structure of a machine can be variously designed.

In particular, since a single table can be both transversely and longitudinally moved, the strength and dynamic characteristics of the planar stage moving apparatus are improved as compared with the case of overlapping two tables of the same area. Further, high precision can be obtained by applying a position sensor such as a linear encoder or a laser displacement measurer. Furthermore, the planar stage moving apparatus can be advantageously applied to a small sized machine tool and a measurement system.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings so that those skilled in the art can easily carry out the present invention.

Figure 1A:
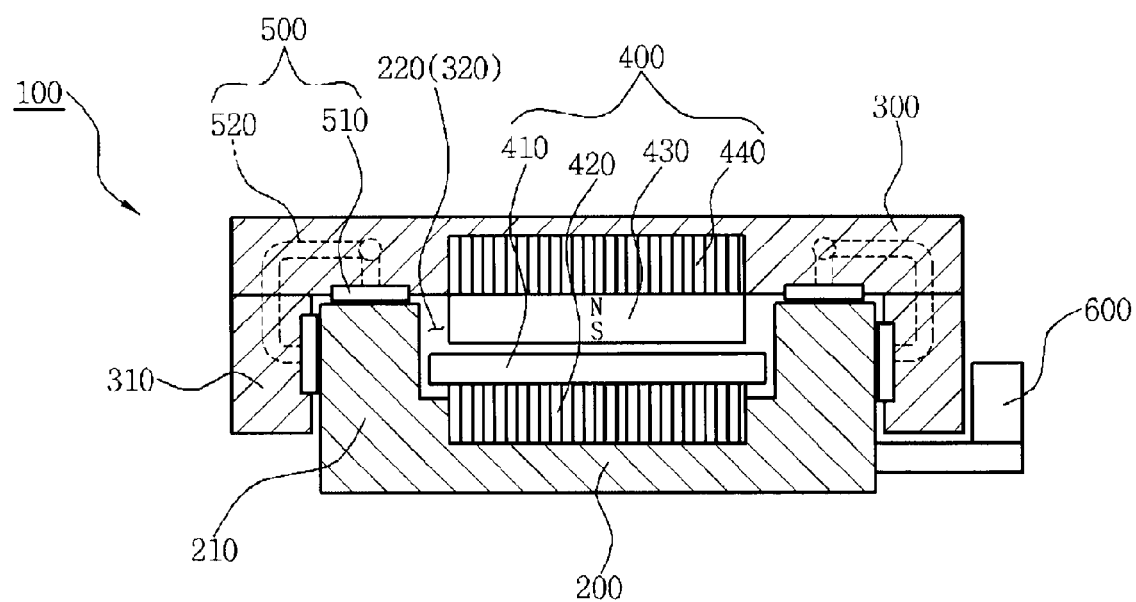
FIGS. 1A and 1B are view for illustrating a conventional planar stage moving apparatus.
Figure 1B:
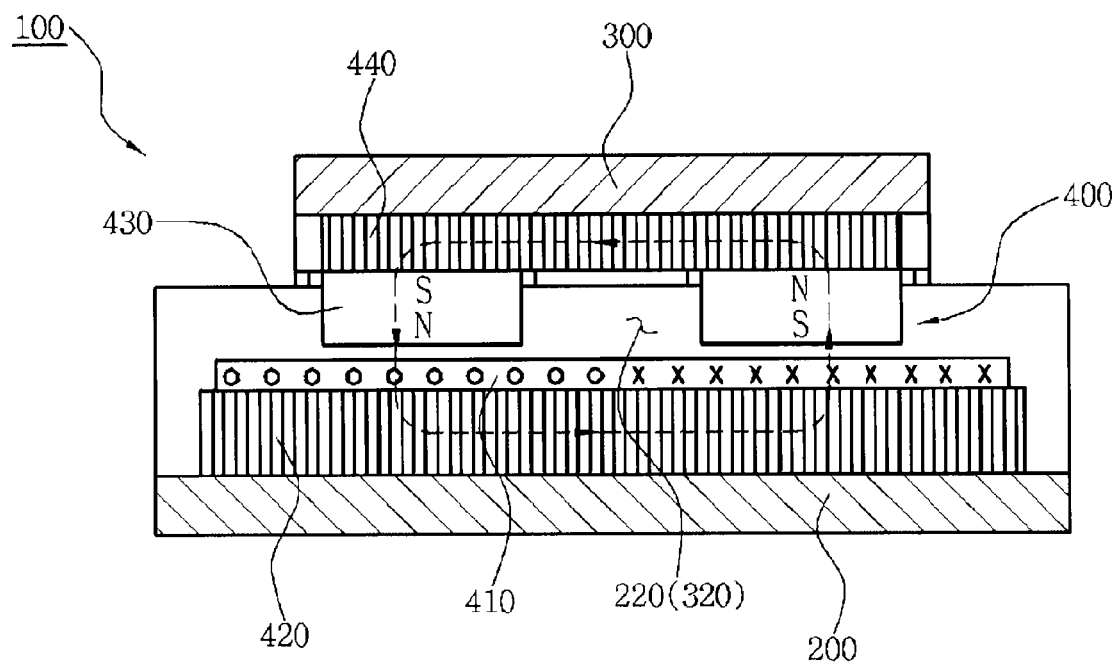
Figure 2:
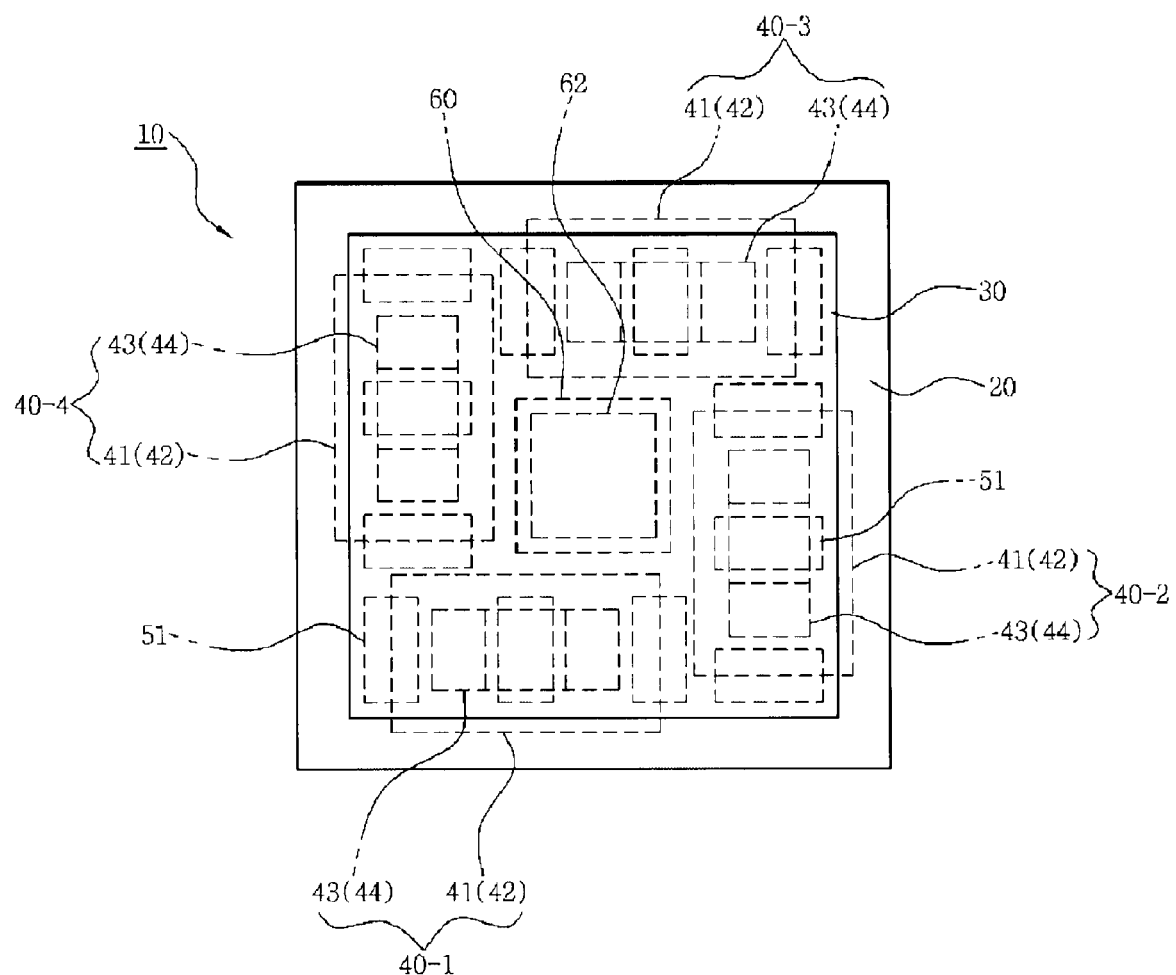
FIG. 2 is a plan view of a planar stage moving apparatus according to an embodiment of the present invention.
Figure 3:
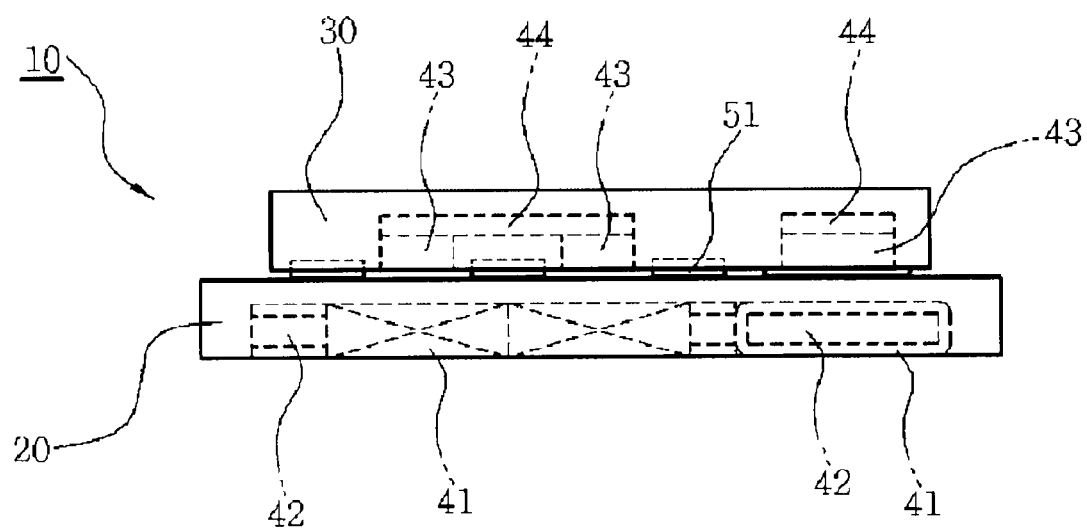
FIG. 3 is a side view of the planar stage moving apparatus according to the embodiment of the present invention.
Figure 4:
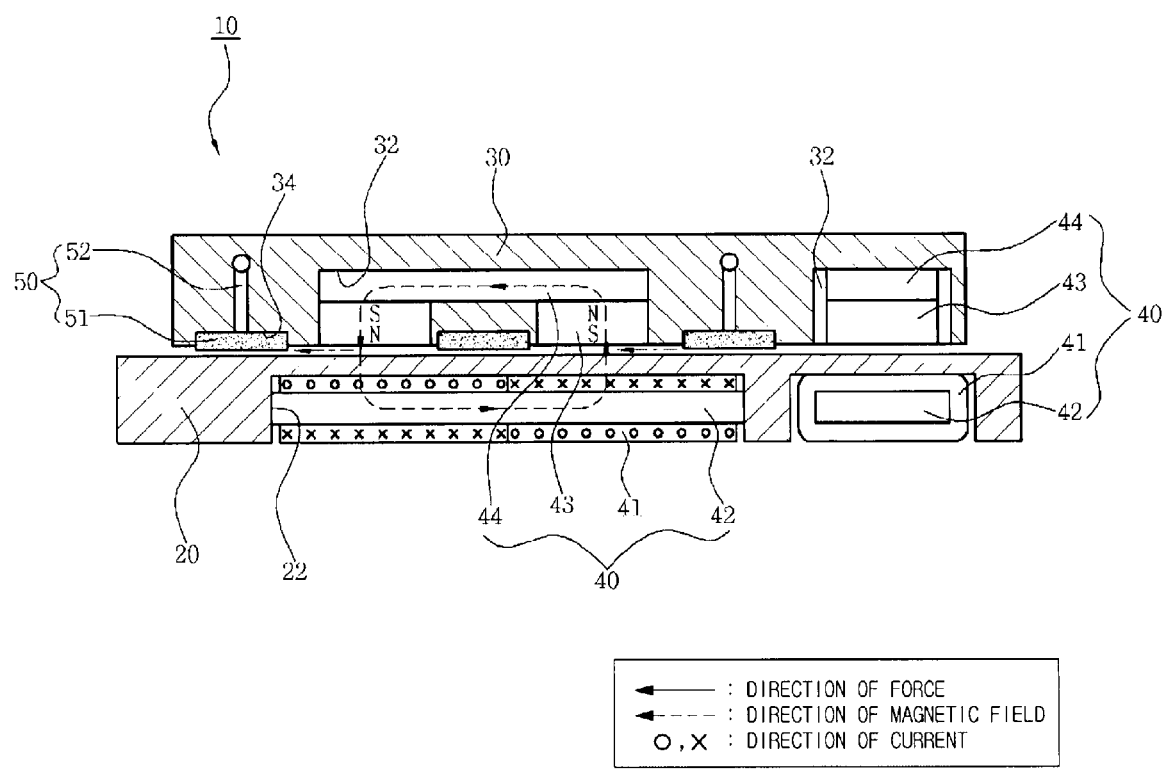
FIG. 4 is a view illustrating a unit linear motor applied to the planar stage moving apparatus according to the embodiment of the present invention.
Figure 5:
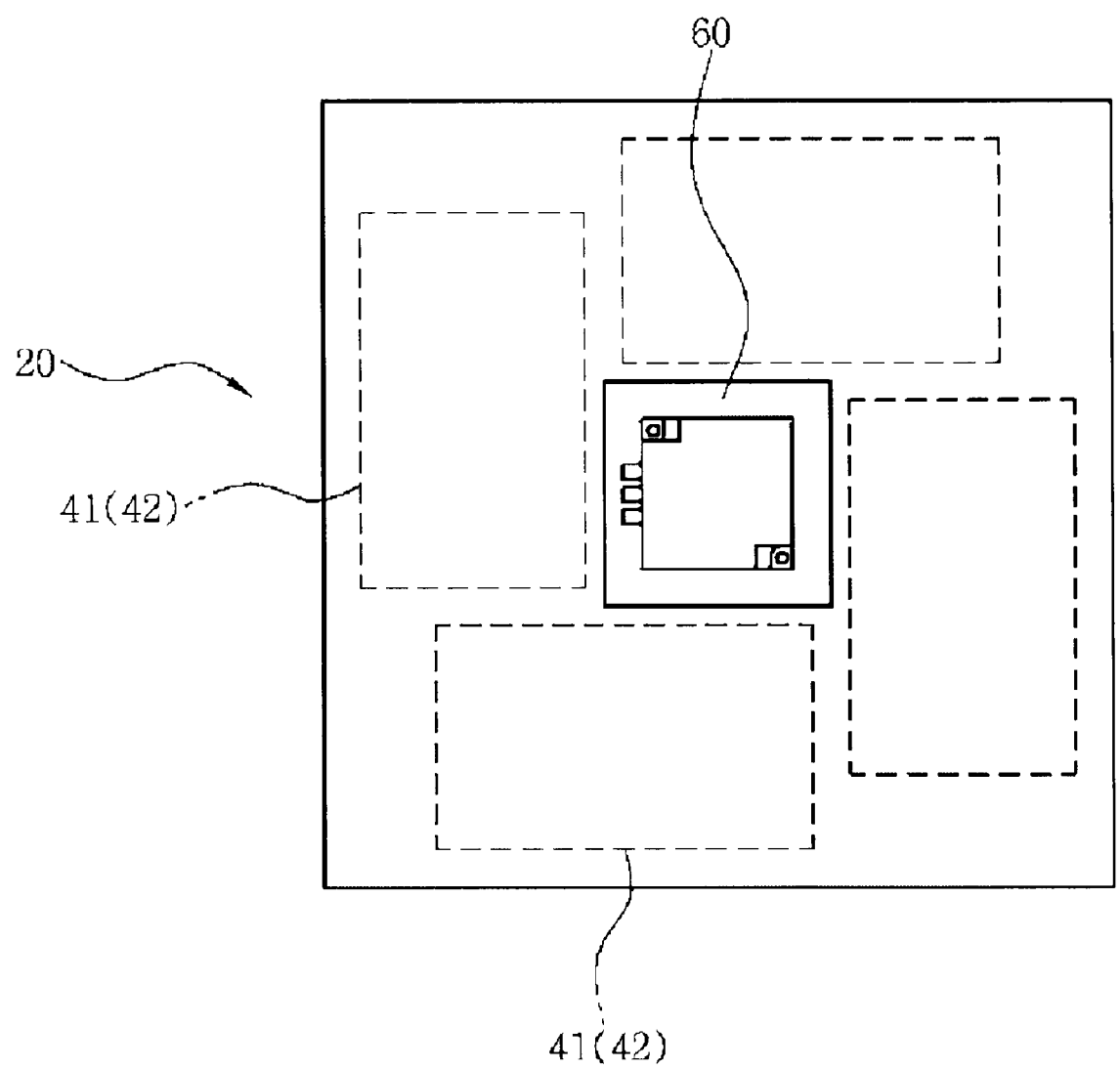
FIG. 5 is a plan view of a base according to the embodiment of the present invention.
Figure 6:
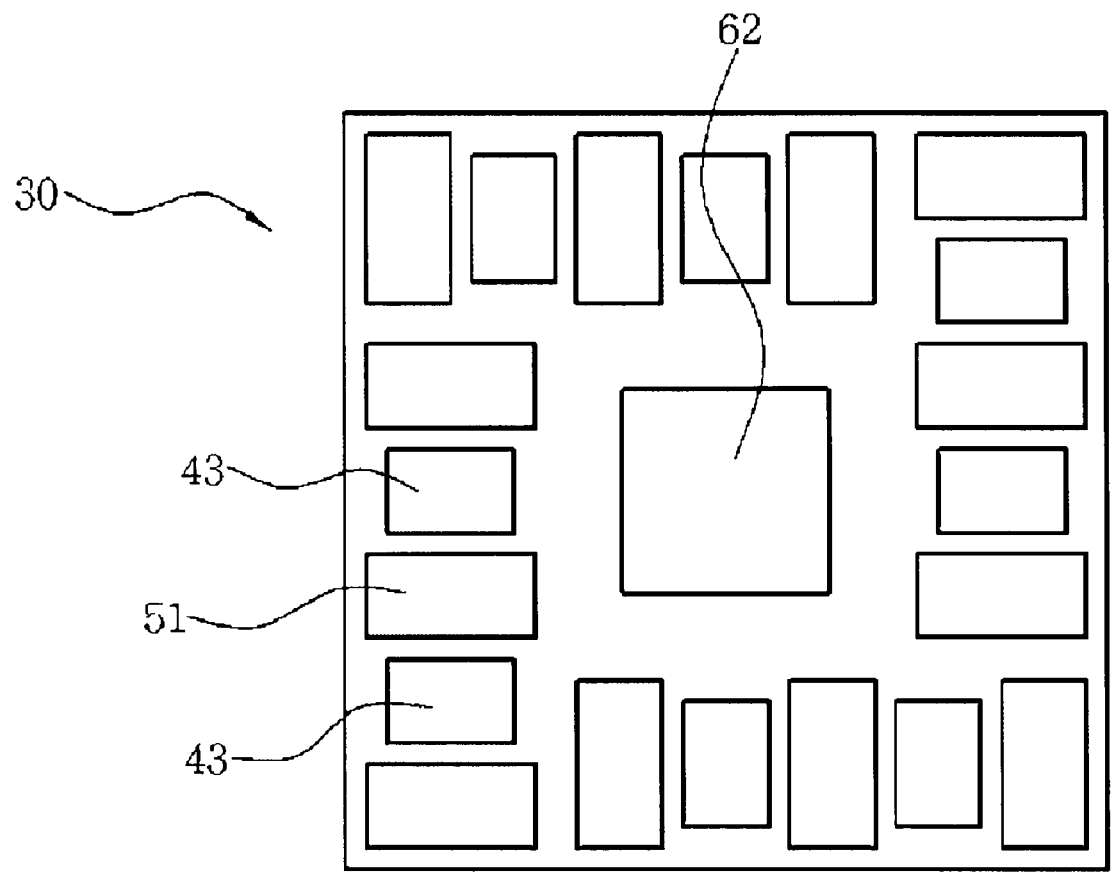
FIG. 6 is a bottom view of a table according to the embodiment of the present invention.

FIG. 2 is a plan view of a planar stage moving apparatus according to an embodiment of the present invention. FIG. 3 is aside view of the planar stage moving apparatus according to the embodiment of the present invention. FIG. 4 is a view illustrating a unit linear motor applied to the planar stage moving apparatus according to the embodiment of the present invention. FIG. 5 is a plan view of abase according to the embodiment of the present invention. FIG. 6 is a bottom view of a table according to the embodiment of the present invention.

In a planar stage moving apparatus 10 according to the embodiment of the present invention, a table 30 can be moved on a base 20 in the transverse direction (X-axis direction), the longitudinal direction (Y-axis direction), and an angular direction, whereby it can be small-sized as compared with the area of the base 20. In this case, the base 20 is a nonmagnetic and nonconductive body, and may be made of a ceramic material of high strength. The table 30 may be made of an aluminum alloy, i.e. a nonmagnetic body.

An above-mentioned linear motor in which a stator core on which a coil is wound is fixed to a base 20, i.e. a fixed body and a mover core to which a permanent magnet is fixed to a table 30, i.e. a movable body is applied as a movement unit for applying a movement force to the table 30 on the base 20. Recessed motor mounting spaces 22 and 32 are formed on the lower side of the base 20 and the lower side of the table 30 to mount the linear motor 40.

In the planar stage moving apparatus according to the embodiment of the present invention, a plurality of linear motors 40 for the transverse, longitudinal, and angular movements of the table 30 are provided on the same plane, whereby a space for the movements of the table 30 is reduced in the process of applying the planar stage moving apparatus to a machine tool such as a milling machine that needs the Y-axis directional movement as well as the X-axis directional movement of the table 30. In other words, the plurality of linear motors 40 may be disposed between the upper surface of the base 20 and the lower surface of the table 30, but in the drawings, four linear motors 40 are provided on the table 30 on the upper, lower, right, and left sides of the table 30. The linear motor on the lower side of the table 30 is a first linear motor 40-1, the linear motor on the right side of the table 30 is a second linear motor 40-2, the linear motor on the upper side of the table 30 is a third linear motor 40-3, and the linear motor on the left side of the table 30 is a fourth linear motor 40-4. The first to fourth motors 40-1 to 40-4 are arbitrarily classified for convenience sake and do not limit the scope of the present invention.

In particular, the two linear motors, i.e. the first linear motor 40-1 and the third linear motor 40-3 that are disposed on the upper and lower sides of the table 30 are provided to move the table 30 transversely, and the two linear motors, i.e. the second linear motor 40-2 and the fourth linear motors 40 that are disposed on the right and left sides of the table 30 are provided to move the table 30 longitudinally.

Space may be advantageously utilized by locating the front end of the first linear motor 40-1 on the front lower side of the table 30, locating the rear end of the third linear motor 40-3 on the rear upper side of the table 30, locating the lower end of the second linear motor 40-2 on the rear lower side of the table 30, and locating the upper end of the fourth linear motor 40-4 on the front upper side of the table 30. A region where the linear motors 40 are not located may exist at the central portion of the base 20 and the table 30 according to the lengths and widths of the unit linear motors, and a linear encoder 60 for measuring movement of the table 30 is provided in the region. In other words, the linear encoder 60 is fixed to a central portion of the base 20, i.e. a fixed body and a scaler 62 in which two-dimensional grids are expressed is attached to a central portion of the table 30.

The linear encoder 60 is a module for controlling movement of the table 30 under the control of an NC controller (not shown) while communicating with the NC controller, and is frequently used in a general NC machine. Accordingly, a detailed description of the linear encoder 60 will be omitted. X and Y-axis directional movements and angular movement of the table 30 may be measured using a plurality of laser interferometers without using grid encoders.

The detailed structure of a unit linear motor 40 is illustrated in FIG. 4. In other words, the coil 41 is wound on the stator core 42 fixed to the base 20 and a pair of permanent magnets 43 are attached to the mover core 44 fixed to the table with the poles of the permanent magnets 43 being different. Accordingly, magnetic fields are created by the permanent magnet 43 as illustrated, whereby when current is applied to the coil 41, the direction of the electromagnetic force is determined according to the directions of the magnetic fields and the direction of the current flowing through the coil 41. As a result, a linear movement force is applied in a direction to the table 30, i.e. a movable body.

The coil 41 is wound on the stator core 42, whereby the directions of currents applied to both sides of the stator core 42 are opposite to each other so that the direction along which a force is applied is determined to be the lengthwise direction of the linear motor according to the directions along which the currents are applied. The symbol 'O' in the drawing expresses the direction along which a current applied to a coil flows toward the front surface of the drawing, and the symbol 'X' expresses the direction along which a current applied to a coil flows toward the rear surface of the drawing.

An attractive force due to the magnetic force is applied between the permanent magnet 43 and the stator core 42 that are elements of the linear motor 40, whereby the lower surface of the table 30 is apt to be attached to the upper surface of the base 20. An air bearing unit 50 is mounted between the base 20 and the table 30 so that the attractive force between the base 20 and the table 30 cannot obstruct the movement force of the table 30 due to the linear motor 40. In other words, the attractive force between the permanent magnet 43 and the stator core 42 balances the repulsive force from the air bearing unit 50 to be applied as a pre-pressure for increasing the strength of the air bearing unit 50.

The air bearing unit 50 provides a pneumatic force in the direction from the lower side of the table 30 toward the upper surface of the base 20, whereby the table 30 can float from the base 20 when it is operated. A plurality of grooves 34 are formed on the bottom surface of the table 30 to attach an air pad 51 that is an essential element of the air bearing unit 50, and air supply lines 52 are provided from an air inlet (not shown) provided on one side of the table 30 to the grooves 34. In particular, the grooves 34 for mounting the air pad 51 are preferably formed between the permanent magnets 43 of the linear motor 40.

Figure 7:
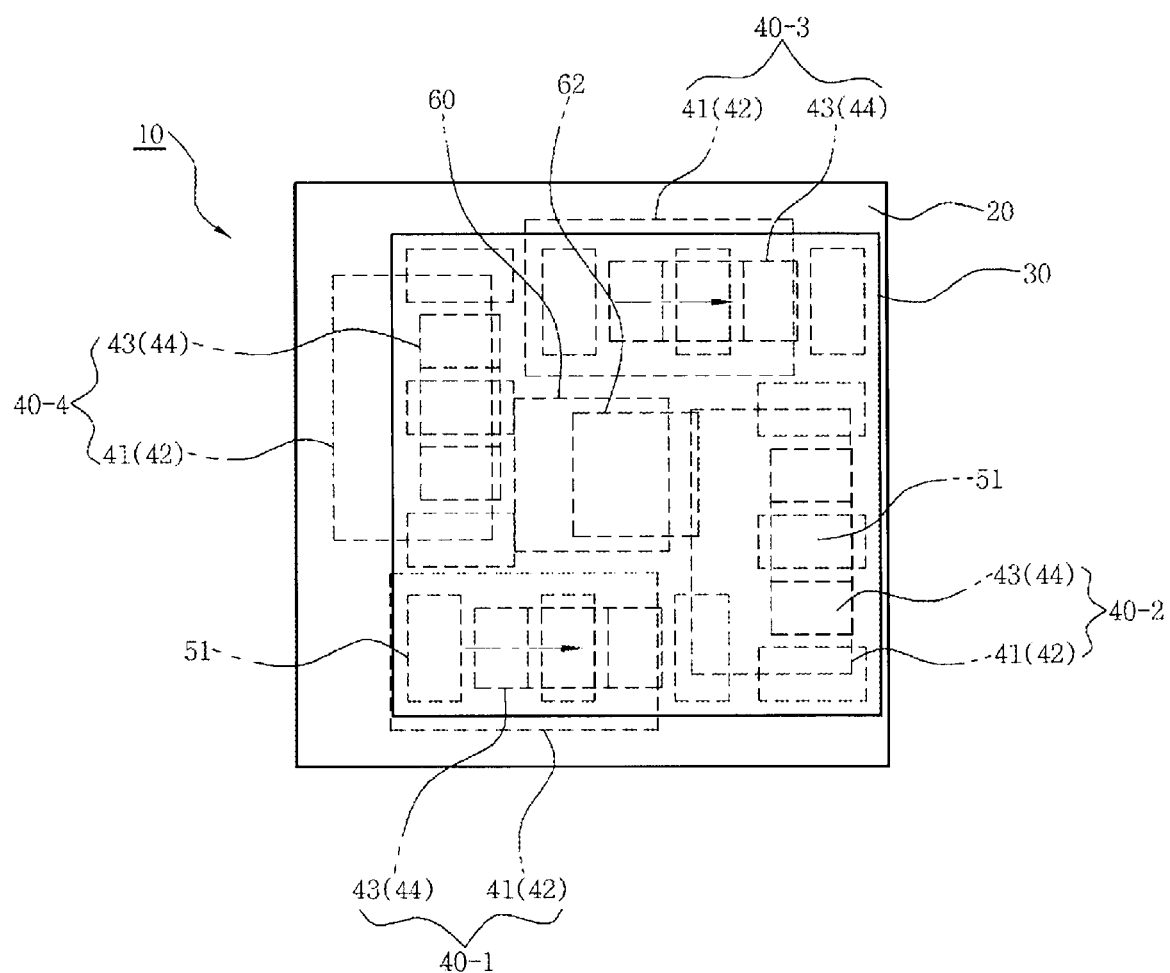
FIG. 7 is a view illustrating movement of the table in the transverse direction (X-axis direction)
Figure 8:
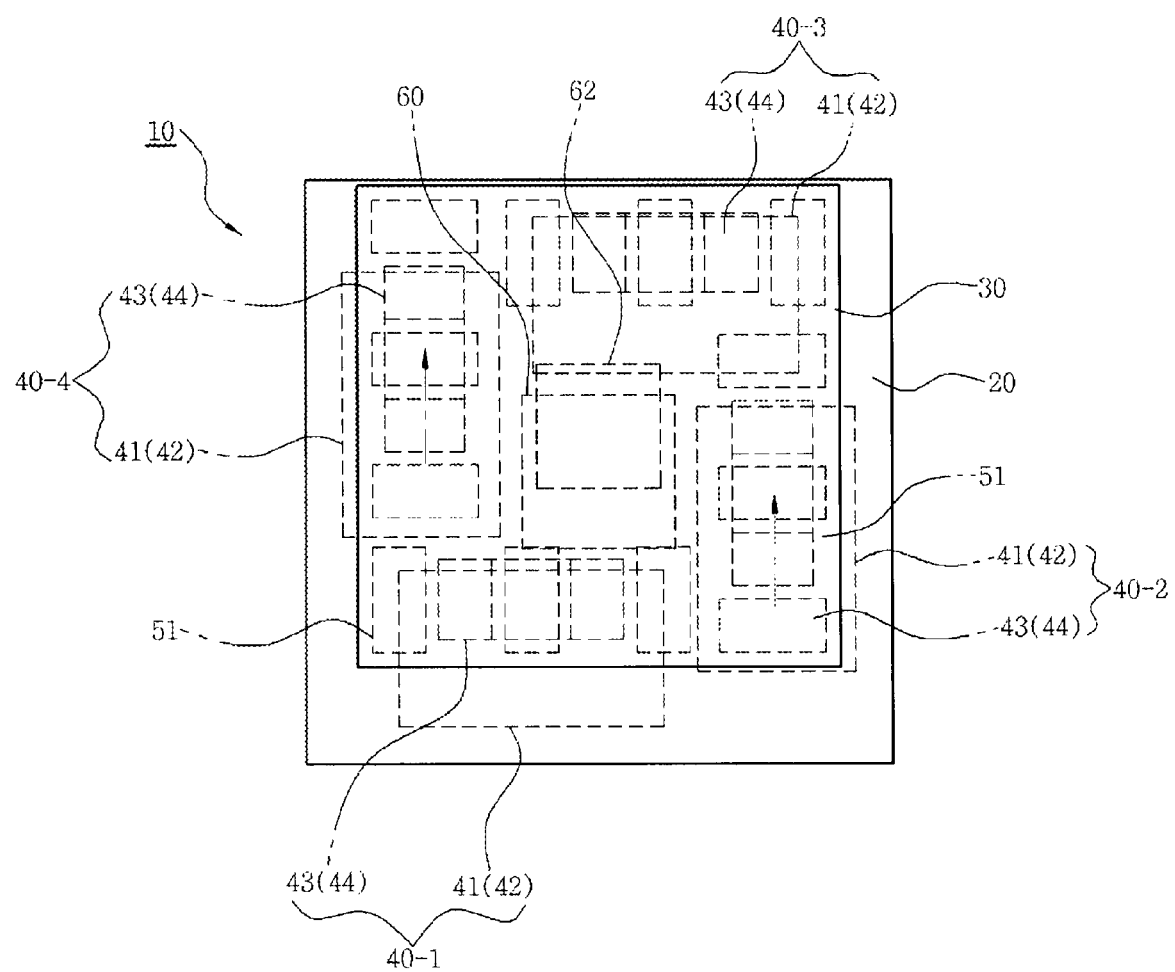
FIG. 8 is a view illustrating movement of the table in the longitudinal direction (Y-axis direction)
Figure 9:
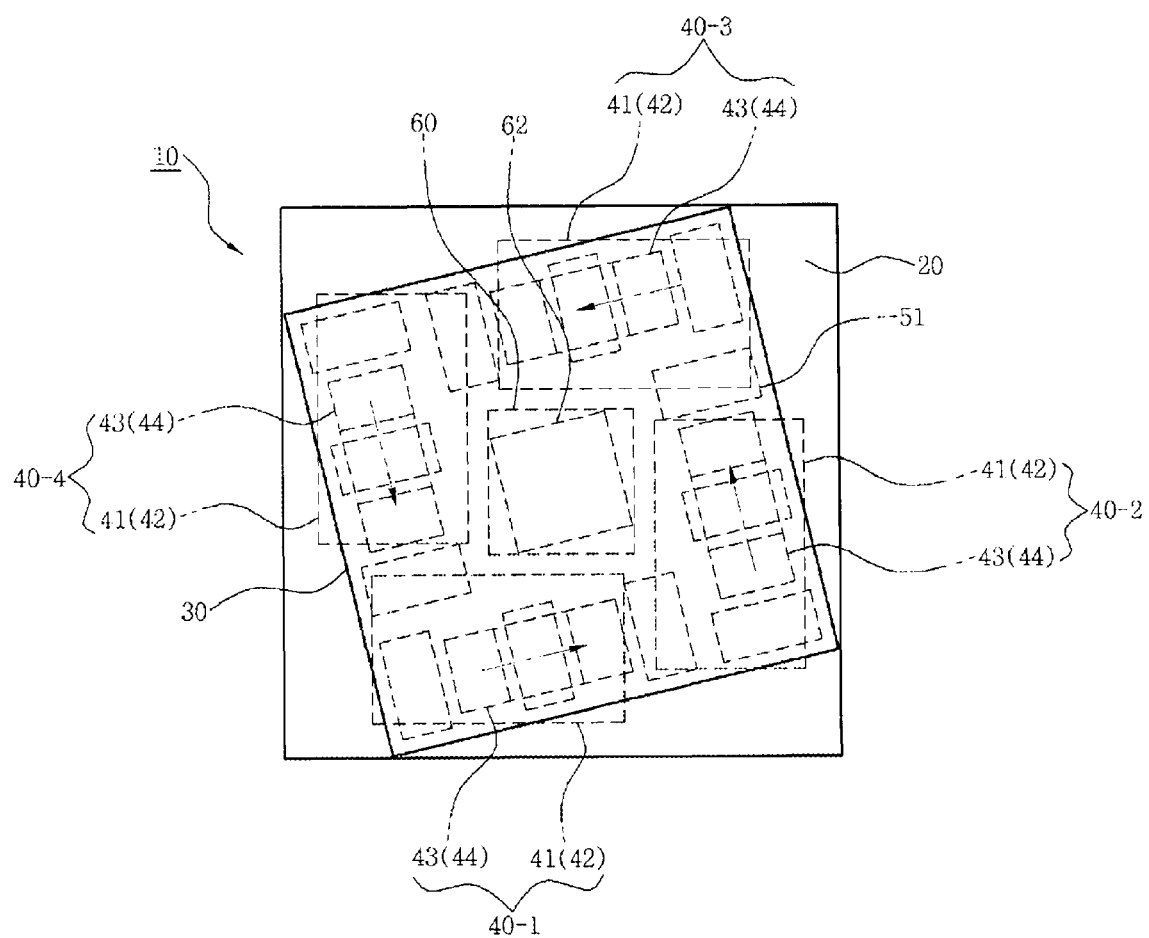
FIG. 9 is a view illustrating angular movement of the table.

FIGS. 7 to 9 are views illustrating drive state of the planar stage moving apparatus according to the embodiment of the present invention. FIG. 7 is a view illustrating movement of the table in the transverse direction (X-axis direction). FIG. 8 is a view illustrating movement of the table in the longitudinal direction (Y-axis direction). FIG. 9 is a view illustrating angular movement of the table.

As illustrated in FIG. 7, in order to move the table 30 transversely, currents are applied only to the coils of the first linear motor 40-1 and the third linear motor 40-3 and the second linear motor 40-2 and the fourth linear motor 40-4 are not operated. Then, the directions of the currents flowing through the coils 41 of the first linear motor 40-1 and the third linear motor 40-3 are determined such that the forces due to magnetic fields are applied from the left side toward the right side of the drawing. The movement speed and movement direction of the table during movement of the table 30 are changed by controlling the strengths and directions of the currents applied to the coils.

As illustrated in FIG. 8, in order to move the table 30 longitudinally, currents are applied only to the coils of the second linear motor 40-2 and the fourth linear motor 40-4 and the first linear motor 40-1 and the third linear motor 40-3 are not operated. Then, the directions of the currents flowing through the coils 41 of the second linear motor 40-2 and the fourth linear motor 40-4 are determined such that the forces due to magnetic fields are applied from the lower side toward the upper side of the drawing.

As illustrated in FIG. 9, in order to move the table 30 angularly, the all four linear motors 40 are operated. In other words, the directions of the currents applied to the coils of the linear motors are determined such that the first linear motor 40-1 and the third linear motor 40-3 are operated in the opposite directions and the second linear motor 40-2 and the fourth linear motor 40-4 are operated in the opposite directions. In FIG. 9, all the forces generated in the first linear motor 40-1, the second linear motor 40-2, the third linear motor 40-3, and the fourth linear motor 40-4 are in the counterclockwise direction, in which case the table 30 is moved in an angular direction.

When a planar stage moving apparatus according to the embodiment of the present invention is applied to a machine such as a machine tool that needs movement of a table, a space occupied by a movement unit for movement of the table can be remarkably reduced, whereby in particular, the size of a small-sized machine tool that requires precise machining can be effectively reduced.

While the invention has been shown and described with respect to the exemplary embodiments, it will be understood by those skilled in the art that the system and the method are only examples of the present invention and various changes and modifications may be made without departing from the spirit and scope of the invention as defined in the following claims.

What is claimed is:

1. A planar stage moving apparatus for a machine comprising:
    first to fourth linear motors for applying, between a base and a table, a movement force to the table, each linear motor including a stator core on which a coil is wound and which is fixed to the base and a mover core to which permanent magnets are attached and which is fixed to the table;
    an air bearing unit to provide a repulsive force between the base and the table, to separate the base and the table and thereby permit to move under the influence of magnet fields when currents are applied to the coils of the linear motors, wherein the air bearing unit comprises a plurality of air bearing pads for each of said linear motors, wherein the air bearing pads are provided between the permanent magnets of each of said linear motors; and a linear encoder installed on one side of the table to measure movement of the table, the first and third linear motors being provided between the base and the table on the lower and upper sides of the table respectively to move the table in the X-axis directional movement of the table, the second and fourth linear motors being provided between the base and the table on the right and left sides of the table respectively to move the table in the Y-axis directional movement of the table, the air pads being fixed to a plurality of grooves formed on the lower surface of the table respectively and a plurality of air supply lines formed at intermediate portions of the table to provide a pneumatic pressure to the grooves respectively.

2. The planar stage moving apparatus of claim 1, wherein the front end of the first linear motor is located on the front lower side of the table, the rear end of the third linear motor is located on the rear upper side of the table, the lower end of the second linear motor is located on the rear lower side of the table, and the upper end of the fourth linear motor is located on the front upper side of the table.

3. The planar stage moving apparatus of claim 1, wherein the coils are wound on both sides of the stator core of the linear motor so that currents flow through the stator core opposite to each other.

4. The planar stage moving apparatus of claim 1, wherein the air pads are located between permanent magnets of the linear motors respectively.

5. The planar stage moving apparatus of claim 1, wherein the linear encoder is fixed to a portion of the base that corresponds to a lower central portion of the table and a scale in which a two-dimensional grid is expressed is attached to a lower central portion of the table.

6. The planar stage moving apparatus of claim 1, wherein the linear motors are simultaneously operated in one direction to angularly move the table.

* * * * *